(12) United States Patent
Castinado et al.

(10) Patent No.: US 12,093,357 B2
(45) Date of Patent: Sep. 17, 2024

(54) BIOMETRIC AUTHENTICATION BASED ON BEHAVIORAL ANALYSIS

(71) Applicant: BANK OF AMERICA CORPORATION, Charlotte, NC (US)

(72) Inventors: Joseph Benjamin Castinado, North Glenn, CO (US); Brandon Ingram, Charlotte, NC (US); Naoll Addisu Merdassa, Chakopee, MN (US); Kevin Graham Robberts, Charlotte, NC (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 637 days.

(21) Appl. No.: 17/388,592

(22) Filed: Jul. 29, 2021

(65) Prior Publication Data
US 2023/0033954 A1  Feb. 2, 2023

(51) Int. Cl.
G06F 21/31 (2013.01)
G06F 21/00 (2013.01)
G06F 21/45 (2013.01)
G06F 21/57 (2013.01)

(52) U.S. Cl.
CPC ............ *G06F 21/316* (2013.01); *G06F 21/45* (2013.01); *G06F 21/577* (2013.01)

(58) Field of Classification Search
CPC ........ G06F 21/577; G06F 21/45; G06F 21/32; G06F 21/50; G06F 21/55; G06F 21/552; G06F 21/554; G06F 21/57
See application file for complete search history.

(56) References Cited

U.S. PATENT DOCUMENTS

| | | | |
|---|---|---|---|
| 7,039,699 B1 | 5/2006 | Narin et al. | |
| 8,775,471 B1 | 7/2014 | Kozyrczak et al. | |
| 8,843,760 B2 | 9/2014 | Atherton | |
| 9,301,140 B1 | 3/2016 | Costigan et al. | |
| 10,069,852 B2 | 9/2018 | Turgeman et al. | |
| 10,754,936 B1 * | 8/2020 | Hawes | G06F 21/45 |
| 10,911,470 B2 | 2/2021 | Muddu et al. | |
| 11,696,682 B2 | 7/2023 | Tran | |
| 2002/0178257 A1 | 11/2002 | Cerrato | |
| 2007/0236330 A1 | 10/2007 | Cho et al. | |
| 2007/0239604 A1 | 10/2007 | O'Connell et al. | |
| 2008/0091453 A1 | 4/2008 | Meehan et al. | |
| 2008/0162202 A1 | 7/2008 | Khanna et al. | |
| 2009/0089869 A1 * | 4/2009 | Varghese | G07F 7/1008 726/7 |

(Continued)

*Primary Examiner* — Edward Zee

(74) *Attorney, Agent, or Firm* — Moore & Van Allen PLLC; James C. Edwards

(57) ABSTRACT

A heightened level of security is provided in a computing platform by monitoring usage of applications and/or services residing on or accessible to a computing platform to determine abnormal usage patterns. In response to determining an abnormal pattern of usage, the user is required to provide biometric data, such as voice data, facial feature data, fingerprint data or the like, as a means of authenticating the user. The abnormal pattern of usage may be determined dynamically by comparing current usage patterns to known user baseline usage patterns. Alternatively, the abnormal pattern of usage is predefined, such as the resetting of passwords in a predefined number of applications and/or services over a predefined period of time.

15 Claims, 4 Drawing Sheets

(56) References Cited

U.S. PATENT DOCUMENTS

| | | |
|---|---|---|
| 2009/0199296 A1 | 8/2009 | Xie et al. |
| 2014/0026220 A1 | 1/2014 | Gehrig, Jr. |
| 2015/0264572 A1 | 9/2015 | Turgeman |

* cited by examiner

BIOMETRIC AUTHENTICATION BASED ON BEHAVIORAL ANALYSIS

FIELD OF THE INVENTION

The present invention is generally directed to computing security and, more specifically, providing for biometric authentication in instances in which behavioral analysis of a user's interaction with two or more applications or services indicates a suspicious/abnormal pattern of use.

BACKGROUND

Once a nefarious entity gains access to a computing platform, they typically perform certain functions within the various applications or services residing or accessible to the computing platform. These functions include, but are not limited to, reconfiguration of application or service settings, such as changing user passwords or the like. These are typically functions that the authorized user of the computing platform would perform on a single or a few applications or services at one time, but typically would not perform on sizeable portion of the applications or services residing on or accessible to the computing platform Therefore, a need exists to develop systems, methods, computer program products and that like that insures that when a suspicious/abnormal pattern of usage occurs in multiple applications or services on a computing platform, security measures are in place to prevent unauthorized users from gaining control over the applications or services (i.e., performing nefarious actions to the detriment of the authorized user(s).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the same above needs and/or achieve other advantages by providing for a heightened level of security within a computing platform. Specifically, the present invention requires a computing platform user to provide biometric data (e.g., voice data, facial feature data, fingerprint data or the like) in response to determining an abnormal pattern of usage within two or more applications or services residing on or accessible to the computing platform. The abnormal usage pattern is contrary to the user's normal patterns of usage.

As a means of determining abnormal usage patterns, the present invention monitors the usage of the applications and services. In specific embodiments, abnormal patterns of usage are determined dynamically by comparing a current usage pattern amongst two or more applications and/or services to predetermined baseline usage patterns. In specific embodiments of the invention, the predetermined baseline usage patterns are determined, over time, by machine learning model(s) or the like.

In other embodiments of the invention, the abnormal usage patterns are predetermined abnormal usage patterns. Specifically, in certain embodiments of the invention, the predetermined abnormal usage pattern is resetting of passwords in two or more applications and/or services. In such embodiments of the invention, the number of applications in which resetting of the password needs to occur and/or the time period over which the pattern must occur may be predefined by the system or the user.

In addition to requiring the user to authenticate by providing biometric data to further access the applications and/or services, the present invention may further generate and communicate alerts to the user or other entities may investigate suspicious activities and/or prevent/mitigate further actions within the applications or services by unauthorized entities.

By requiring the user to provide biometric data, the computing platform is insured that the user is, in fact, an authorized user and not an unauthorized user attempting to access and conduct unauthorized and nefarious activities within the applications and/or services.

A system for requiring biometric user authentication defines first embodiments of the invention. The system includes a computing platform having a memory and at least one processing device in communication with the memory. The system additionally includes a plurality of at least one of (i) applications stored in the memory and executable by the at least one processing device, and (ii) network-accessible services. Additionally, the system includes a user authentication engine that is stored in the memory and executable by the at least one processing device. The user authentication engine is configured to monitor usage, by a user, of the plurality of applications and services and, in response, determine an abnormal pattern of usage amongst at least two of the plurality of applications and services that is contrary to the user's normal patterns of usage. Further, the user authentication engine is configured to, in response to determining the abnormal pattern of usage, require a user to authenticate by providing predefined biometric data to further access the plurality of applications and services.

In specific embodiments of the system, the user authentication engine is further configured to receive the user's predefined biometric data and authenticate the user based on a match between the received predefined biometric data and previously stored predefined biometric data. In specific embodiments of the system the predefined biometric data may include, but is not limited to, voice data, facial feature data, fingerprint data and the like.

In specific embodiments of the invention, the abnormal pattern of usage occurs in a predetermined number (greater than one) of applications and/or services and over a predetermined period of time (e.g., within a thirty-minute interval) or the like. In such embodiments of the invention, the user authentication engine may be further configured with a user interface that allows for a user to preconfigure at least one of (i) a predetermined number of the plurality of applications and services for determining the abnormal pattern of usage, and (ii) a predetermined period of time for determining the abnormal pattern of usage.

In other specific embodiments of the system, the user authentication engine is further configured to determine the abnormal pattern of usage by comparing current usage of the at least two of the plurality applications and services to one or more predetermined baseline usage patterns associated with the user. The baseline usage patterns may be determined by implementing machine learning techniques on the monitored usage of the applications and/or services.

In other embodiments of the system, the user authentication engine is configured to determine predetermined abnormal patterns of usage. One such predetermined abnormal pattern of usage is the resetting of passwords within the at least two of the plurality of applications and services. In specific such embodiments of the system, the predetermined abnormal pattern of usage may be resetting of the passwords within (i) a predetermined number of the plurality of applications and services and (ii) during a predetermined period of time.

In more specific embodiments of the system, the user authentication engine is further configured to, in response to determining the abnormal pattern of usage, generate and communicate an alert to a predetermined entity. The predetermined entity may be the user or another entity trained in preventing/mitigating further suspicious activities on the computing platform.

A computer-implemented method for requiring biometric user authentication defines second embodiments of the invention. The computer-implemented method is executable by one or more computing processor devices. The method includes monitoring usage, by a user, of the plurality of applications and services and the plurality of services and, in response to the monitoring, determining an abnormal pattern of usage amongst at least two of the plurality of applications and services that is contrary to the user's normal patterns of usage, The method further includes, in response to determining the abnormal pattern of usage, requiring a user to provide predefined biometric data to further access the plurality of applications and services.

In specific embodiments, the computer-implemented method further includes receiving the predefined biometric data and authenticating the user based on a match between the received predefined biometric data and previously stored predefined biometric data. In such embodiments of the computer-implemented method, the biometric data may include, but is not limited to, voice data, facial feature data, fingerprint data and the like.

In other specific embodiments of the computer-implemented method, determining the abnormal pattern of usage further includes comparing current usage of the at least two of the plurality applications and services to one or more predetermined baseline usage patterns associated with the user. In such embodiments of the method, the predetermined baseline usage patterns may be determined by machine learning techniques/model(s) that rely on the monitored usage data.

In other specific embodiments of the computer-implemented method, determining the abnormal pattern of usage further includes determining a predetermined abnormal pattern of usage, specifically resetting of passwords within the at least two of the plurality of applications and services. In such embodiments of the computer-implemented method, determining further includes determining resetting of the passwords within (i) a predetermined number of the plurality of applications and services and (ii) over a predetermined period of time.

A computer program product including a non-transitory computer-readable medium defines third embodiments of the invention. The non-transitory computer-readable medium includes a first set of codes for causing a computer to monitor usage, by a user, of the plurality of applications and services and the plurality of services. In addition, the computer-readable medium includes a second set of codes for causing a computer to, in response to the monitoring, determine an abnormal pattern of usage amongst at least two of the plurality of applications and services that is contrary to the user's normal patterns of usage. Further, the computer-readable medium includes a third set of codes for causing a computer to, in response to determining the abnormal pattern of usage amongst the at least two of the plurality of applications and services, require a user to provide predefined biometric data to further access the plurality of applications and services.

In specific embodiments of the computer program product, the computer-readable medium further includes a fourth set of codes for causing a computer to receive the predefined biometric data and authenticate the user based on a match between the received predefined biometric data and previously stored predefined biometric data. In such embodiments of the computer program product, the biometric data may include, but is not limited to, voice data, facial feature data, fingerprint data and the like.

In other specific embodiments of the computer program product, the second set of codes for causing the computer to determine the abnormal pattern of usage are further configured to cause the computer to compare current usage of the at least two of the plurality applications and services to one or more predetermined baseline usage patterns associated with the user.

In still further specific embodiments of the computer program product, the second set of codes for causing the computer to determine the abnormal pattern of usage are further configured to cause the computer to determine the predetermined abnormal pattern of usage, which is defined as resetting of passwords within the at least two of the plurality of applications and services.

Thus, according to embodiments of the invention, which will be discussed in greater detail below, the present invention addresses needs and/or achieves other advantages by providing for providing for a heightened level of security in a computing platform. Specifically, the present invention, monitors usage of applications and/or services residing on or accessible to a computing platform to determine abnormal usage patterns (i.e., usage patterns that are contrary to the user's conventional usage patterns). In response to determining an abnormal pattern of usage, the user is required to provide biometric data, such as voice data, facial feature data, fingerprint data or the like, as a means of authenticating the user. In specific embodiments of the invention, the abnormal pattern of usage is determined dynamically by comparing current usage patterns to known user baseline usage patterns. In other specific embodiments of the invention, the abnormal pattern of usage is predefined, such as the resetting of passwords in a predefined number of applications and/or services over a predefined period of time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
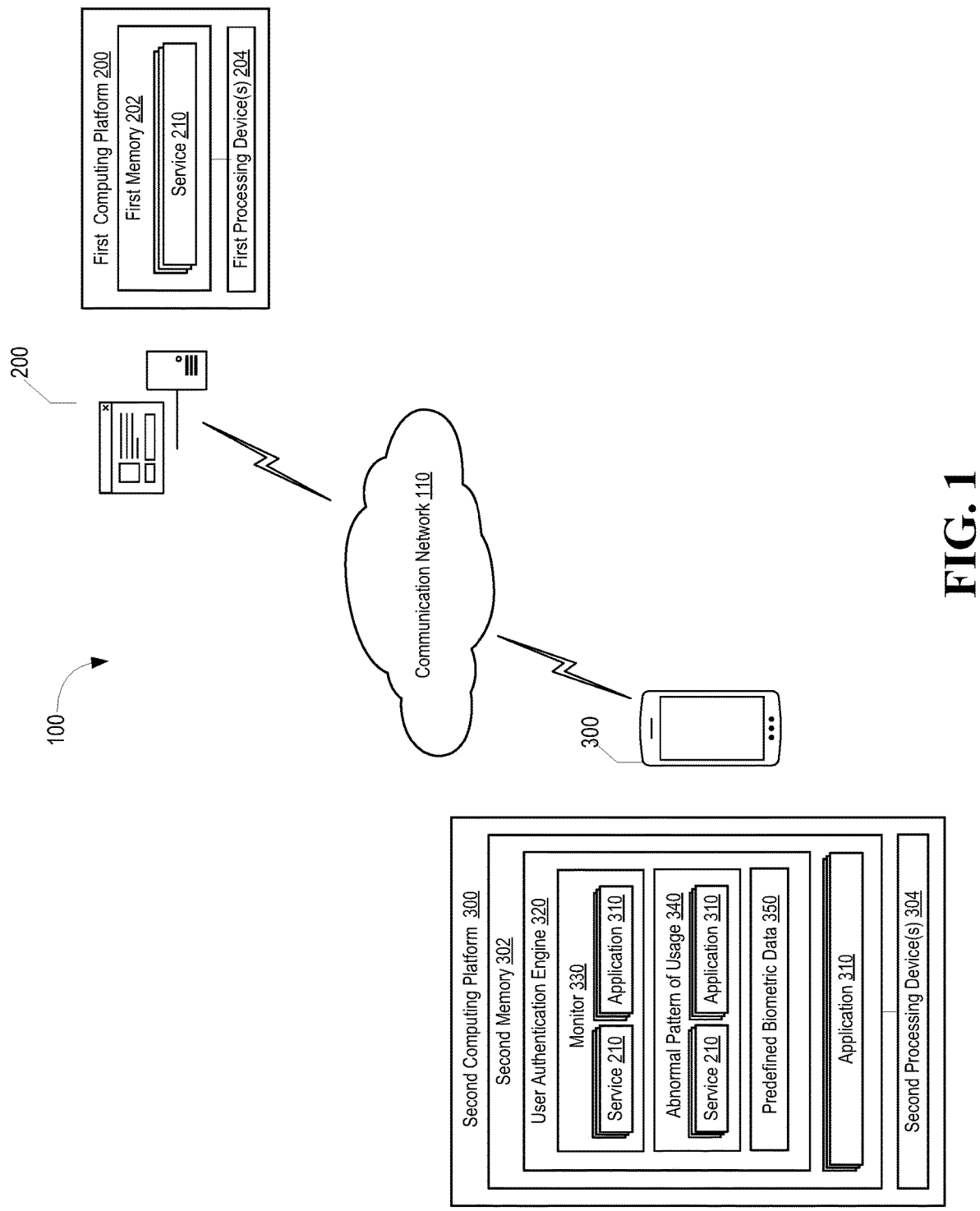
Figure 2:
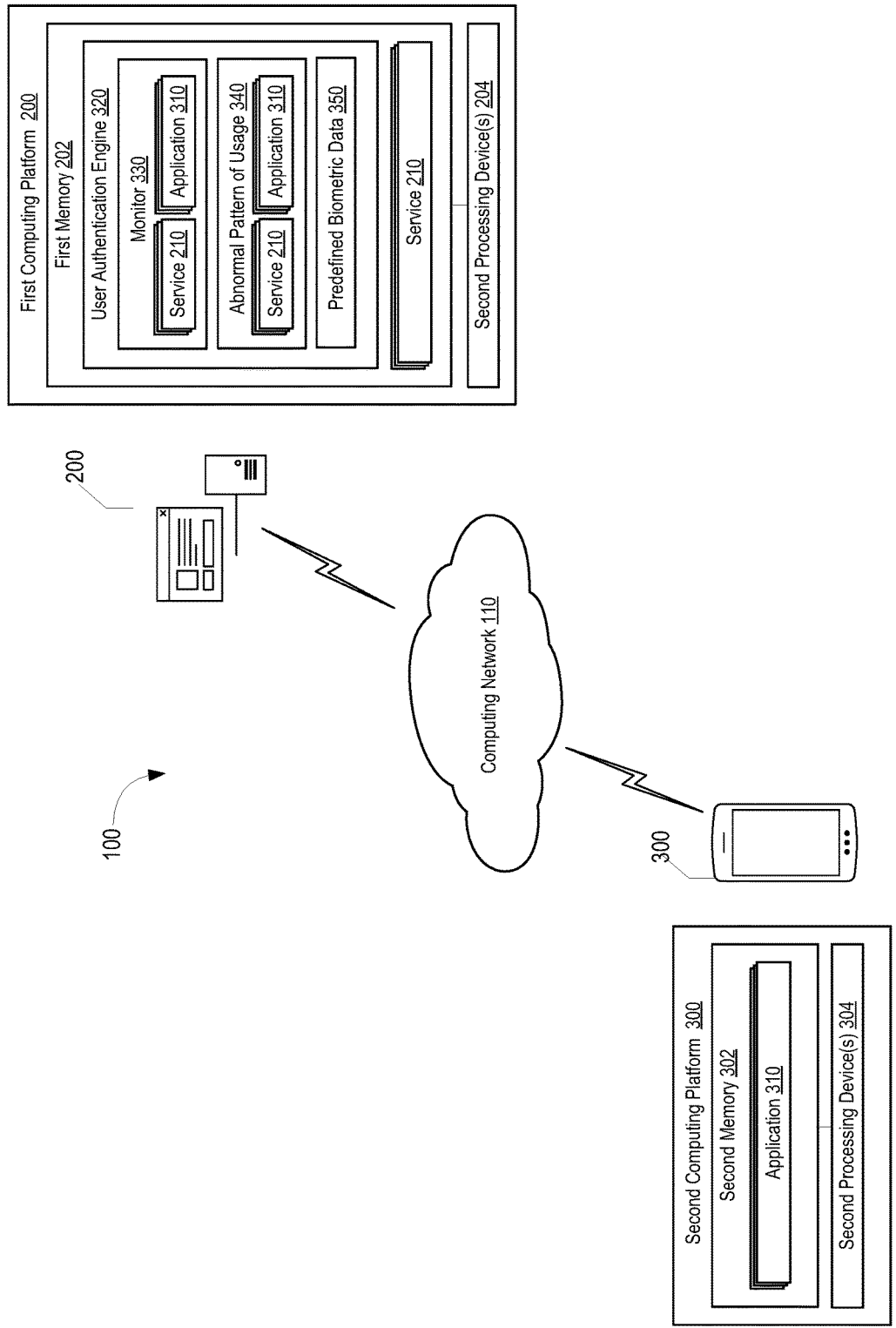
Figure 3:
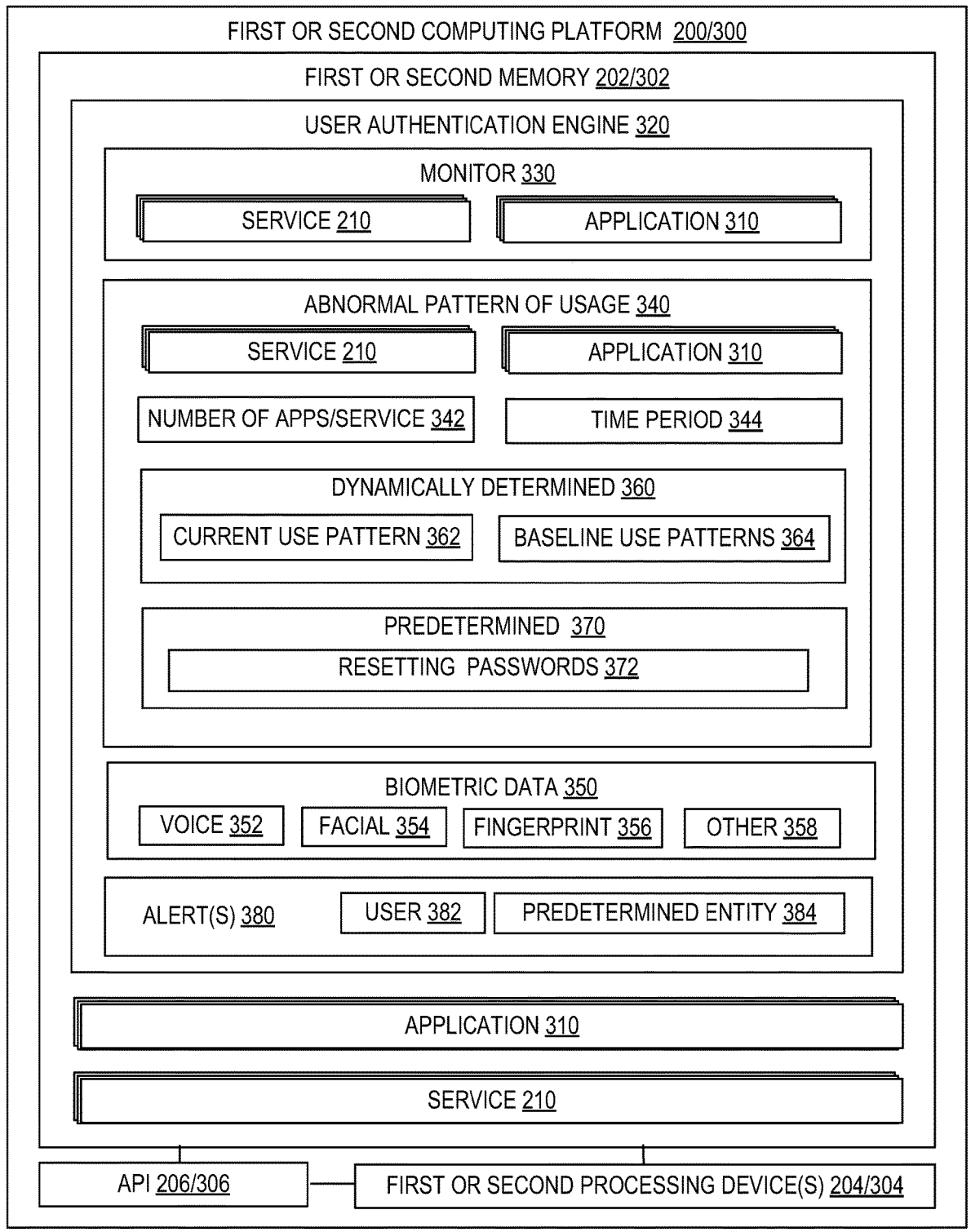
Figure 4:
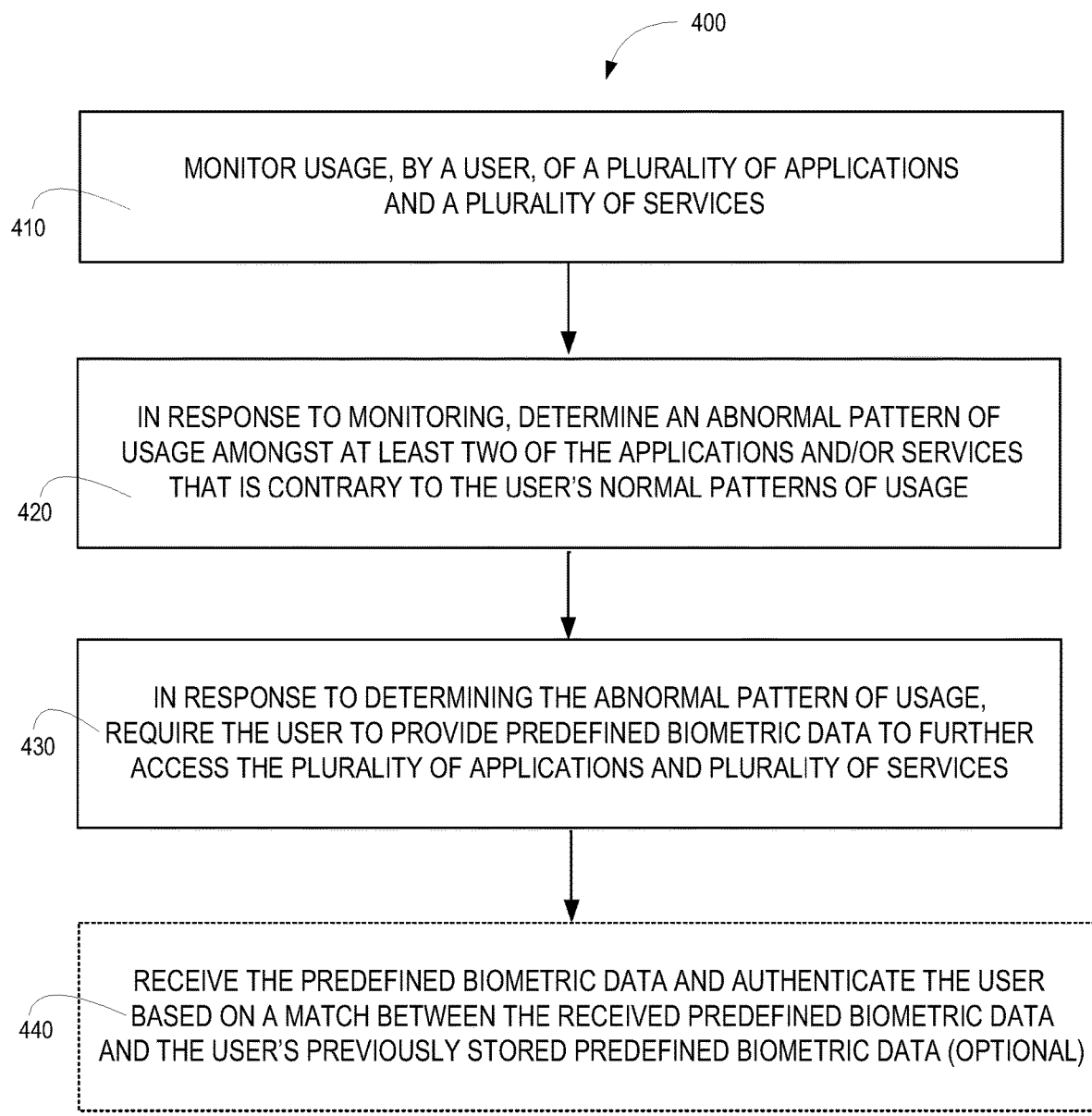

Having thus described embodiments of the disclosure in general terms, reference will now be made to the accompanying drawings, wherein:

FIG. 1 is a schematic/block diagram of a system for biometric user authentication in response to detection of an abnormal pattern of usage in two or more applications and/or services, in accordance with embodiments of the present invention;

FIG. 2 is a schematic diagram of a system for biometric user authentication in response to detection of an abnormal pattern of usage in two or more applications and/or services, in accordance with embodiments of the present invention;

FIG. 3 is a block diagram of a computing platform configured for biometric user authentication in response to detection of an abnormal pattern of usage in two or more applications and/or services, in accordance with embodiments of the present invention; and FIG. 4 is a flow diagram of a method for biometric user authentication in response to detection of an abnormal pattern of usage in two or more applications and/or services, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a heightened level of security within a computing platform. Specifically, the present invention requires a computing platform user to provide biometric data (e.g., voice data, facial feature data, fingerprint data or the like) in response to determining an abnormal pattern of usage within two or more applications or services residing on or accessible to the computing platform. The abnormal usage pattern is contrary to the user's normal patterns of usage for the corresponding applications and/or services As a means of determining abnormal usage patterns, the present invention monitors the usage of the applications and services. In specific embodiments, abnormal patterns of usage are determined dynamically by comparing current usage pattern(s) amongst two or more applications and/or services to predetermined baseline usage patterns. In specific embodiments of the invention, the predetermined baseline usage patterns are determined, over time, by machine learning model(s) or the like.

In other embodiments of the invention, the abnormal usage patterns are predetermined abnormal usage patterns.

Specifically, in certain embodiments of the invention, the predetermined abnormal usage pattern is resetting of passwords in two or more applications and/or services. In such embodiments of the invention, the number of applications in which resetting of the password needs to occur and/or the time period over which the pattern must occur may be predefined by the system or through user configuration.

In addition to requiring the user to authenticate by providing biometric data to further access the applications and/or services, the present invention may further generate and communicate alerts to the user or other entities may investigate suspicious activities and/or prevent/mitigate further actions within the applications or services by unauthorized entities.

By requiring the user to provide biometric data, the present invention ensures that the user is an authorized user and not an unauthorized user attempting to access and conduct unauthorized and nefarious activities within the applications and/or services.

Referring to FIG. 1, a schematic/block diagram is presented of an exemplary system 100 for requiring biometric user authentication, in accordance with embodiments of the present invention. As depicted, the system 100 includes a first computing platform 200 and a second computing platform 300 that are in communication via communication network 110, which may include the Internet, one or more intranets, one or more cellular networks, or a combination thereof.

First computing platform 200, which may comprise a plurality of servers or the like, includes first memory 202 and one or more first processing devices 204 in communication with the first memory 202. First memory stores a plurality of services 210 that are accessible to a user via communication network 110, such as Internet-based services or the like. In specific embodiments of the system, the plurality of services 210 require a user to perform an authentication process as a means of verifying the user's identity. Specifically, in further specific embodiments of the system, the authentication process provides for the presentation of a user password or the like, which must match a previously stored user password in order to successfully complete the authentication process.

Second computing platform 300, otherwise referred to as a user computing platform may comprise a mobile communication device, laptop computer, personal computer, or the like. Second computing platform 300 includes second memory 302 and one or more second processing devices 304 in communication with the second memory 302. Second memory 302 stores a plurality of applications 310. Similar to the services 210, in specific embodiments of the system, the plurality of applications 310 require a user to perform an authentication process as a means of verifying the user's identity. Specifically, in further specific embodiments of the system, the authentication process provides for the presentation of a user password or the like, which must match a previously stored user password in order to successfully complete the authentication process.

Further, second memory 320 stores user authentication engine 320 that is executable by at least one of the one or more second processing devices 304. User authentication engine 320 is configured to monitor 330 usage, by a user, of the plurality of services 210 and the plurality of applications 310. In response to the monitoring 330, the user authentication engine 320 is further configured to determine/identify an abnormal pattern of usage 340 amongst at least two of the plurality of services 210 and applications 310. The abnormal pattern of usage is contrary to the user's normal patterns of usage. The abnormal normal pattern of usage 340 may be determined from amongst two or more of the plurality of services 210, two or more of the plurality of applications 310 or a combination of two or more of the services 210 and applications 310. In specific embodiments of the invention, the services 210 or applications 310 are accessible via or used in accordance with a digital wallet stored in the second memory 302 of the second computing platform 300.

As will be discussed in greater detail infra. in regard to FIG. 3, the abnormal pattern of usage 340 may be determined dynamically by comparing a current pattern of usage to the user's known pattern of usage or the abnormal pattern of usage 340 may be predefined (e.g., changing the passwords within two or more services 210/application 310 within a predefined time period or the like).

In response to determining/identifying an abnormal pattern of usage 340, user authentication engine 320 is further configured to require the user to authenticate by providing predefined biometric data 350 in order to gain access to or further access the plurality of applications and services. The predefined biometric data 350 may include, but is not limited to, voice data, facial feature data, fingerprint data or the like. In specific embodiments of the system, the user authentication engine 320 is further configured to receive the predefined biometric data 350 from the user and authenticate the user based on a match between the received predefined biometric data 350 and previously stored predefined biometric data. In specific embodiments of the system, in which the biometric data, such as facial feature data can be received absent user knowledge, the authentication may occur absent the knowledge of the user.

Referring to FIG. 2, a schematic/block diagram is presented of another exemplary system 100 for requiring biometric user authentication, in accordance with embodiments of the present invention. The system 100 shown in FIG. 2 is the same as the system 100 shown in described in FIG. 1, except the user authentication engine 320 resides in and is executed from the first memory 202 of the first computing platform 200. It should be noted that in most instances of the system, the user authentication 320 resides in a different apparatus/device (e.g., different servers) than the plurality of services 210. Thus in such embodiments of the invention, the monitoring 330 of use of services 210 and applications 310 and the determination/identification of abnormal patterns of usage 340 occurs exclusively at the network-level as opposed to the user device-level (i.e., at second computing platform 300)

Referring to FIG. 2, a block diagram is depicted of first or second computing platform 200/300, in accordance with embodiments of the present invention. In addition to providing greater detail, FIG. 2 highlights various alternate embodiments of the user authentication engine 320. As previously discussed, first and second computing platform 200/300 comprises one or more computing devices/apparatus, such as a mobile communication device (i.e., second computing platform 300) and servers (i.e., first computing platform 200) or the like configured to execute software programs, including instructions, engines, algorithms, modules, routines, applications and services, tools, and the like. First and second computing platform 300/300 include first and second memory 202/302 respectively, which may comprise volatile and non-volatile memory, such as read-only and/or random-access memory (RAM and ROM), EPROM, EEPROM, flash cards, or any memory common to computer platforms). Moreover, first and second memory 202/302 may comprise cloud storage, such as provided by a cloud storage service and/or a cloud connection service.

Further, first and second computing platform 200/300 also includes first and second processing device(s) 204/304 respectively, which may be an application-specific integrated circuit ("ASIC"), or other chipset, logic circuit, or other data processing device. First and second processing device 204/304 may execute an application programming interface ("API") 206/306 respectively that interfaces with any resident programs, such as user authentication engine 320 and algorithms, sub-engines/routines associated therewith or the like stored in the first or second memory 2002/302 of the first or second computing platform 200/300.

First and second processing device(s) 204/304 may include various processing subsystems (not shown in FIG. 3) embodied in hardware, firmware, software, and combinations thereof, that enable the functionality of first and second computing platform 200/300 and the operability of first and second computing platform 200/300 on a distributed communication network 110 (shown in FIGS. 1 and 2). For example, processing subsystems allow for initiating and maintaining communications and exchanging data with other networked devices. For the disclosed aspects, processing subsystems of first and second processing device 204/304 may include any subsystem used in conjunction with user authentication engine 320 and related sub-engines/routines, algorithms, sub-algorithms, modules, sub-modules thereof.

Additionally, first and second computing platform 200/300 includes a communications module (not shown in FIG. 3) embodied in hardware, firmware, software, and combinations thereof, that enables electronic communications between first and second computing platform 200/300 and other networks and/or networked devices, such as, second and first computing platform 300/200 respectively and the like. Thus, the communication module may include the requisite hardware, firmware, software and/or combinations thereof for establishing and maintaining a network communication connection with one or more systems, platforms, networks, or the like.

As previously discussed in relation to FIGS. 1 and 2, first or second memory 202/302 stores user authentication engine 320 that is executable by the first or second processing device(s) 204/304 respectively. User authentication engine 320 is configured to monitor use, by a user, of a plurality of network-accessible services 210 and applications 310. In response to the monitor (or as a result of the monitoring), user authentication engine 320 is configured to determine an abnormal pattern of usage 340 amongst two or more of the services 210 and applications 310. As previously noted, the abnormal pattern of usage 340 is any usage pattern that is contrary to the user's normal or conventional usage. In specific embodiments of the invention, the abnormal pattern of usage 340 occurs within a predetermined number 342 of the services 210 and applications 310 (i.e., a predetermined number 342 which is greater than one). In further specific embodiments of the invention, the abnormal pattern of usage 340 occurs within a predetermined time period (e.g., within 10, 15, 30 minutes or the like).

In specific embodiments of the invention, the abnormal pattern of usage 340 is a dynamically determined 360 abnormal pattern of usage 340. In such embodiments of the invention, a machine learning model (not shown in FIG. 3) may be trained based on previous monitoring results to determine baseline usage patterns 364 specific to a user and services 210 and applications 310. Baseline usage patterns 364 define what is deemed to be "normal" patterns of usage for the user. In such embodiments of the invention, abnormal patterns of usage 340 are determined/identified by comparing current usage patterns 362 of the two or more services 210 and/or applications 310 to the baseline usage patterns 364. Current patterns of usage 362 that deviate from the baseline patterns of usage 364 by a predetermined amount are deemed to abnormal patterns of usage 340 that prompt the need for a heightened level of authentication (i.e., biometric data authentication).

In other embodiments of the invention, the abnormal pattern of usage 340 is a predefined 370 abnormal pattern of usage 340, which may be determined by the engine 320 or by the user. In specific embodiments of the invention, the predefined 370 abnormal pattern of usage 340 is resetting passwords 372. Thus, in such embodiments of the invention, the abnormal pattern of usage may be resetting the passwords of a predetermined number 342 of services 210 and/or applications 310 over a predetermined time period 344. The predetermined number 342 of services 210 and/or applications 310 and/or the predetermined time period 344 may be preconfigured within the engine 320 and/or configurable by the user.

In response to determining/identifying the abnormal pattern of usage 340, the user authentication engine 320 is configured to require the user to submit predefined biometric data 350. As previously discussed, the predefined biometric data 350 may include, but is not limited to, voice data 352, facial feature data 354, fingerprint data 356 or any other 358 known or future known biometric data 350.

In additional embodiments of the invention, the user authentication engine 320 is configured to generate and initiate communication of alerts 380 to the user 382 or one or more predetermined entities 384, such as entities tasked with investigating suspicious activities on computing platforms. In specific embodiments of the invention, the alerts 380 are generated and communicated in response to determining/identifying the abnormal pattern of usage 340. While in other embodiments of the invention, the alerts 384 may be generated in response to not receiving the user's biometric data or receiving biometric data that does not match the user's previously stored biometric data. In other words, an alert may be generated and communicated since the abnormal pattern of usage 340 may be coming from a user/entity other than the user authorized to perform such actions (e.g., a suspicious entity who may be performing the actions to the detriment of the authorized user).

Referring to FIG. 4, a flow diagram is depicted of a method 400 for requiring and implementing biometric user authentication, in accordance with embodiments of the present invention. At Event 410, a plurality of services and/or applications are monitored for usage, and at Event 420, in response to the monitoring, an abnormal pattern of usage amongst at least two of the services and/or applications is determined/identified, which is contrary to the user's normal/convention patterns of use. In specific embodiments of the method, the abnormal pattern of usage may be defined by occurrence within a predetermined number of applications and/or services and occurring within a predetermined time period. In such embodiments of the method, the predetermined number of applications and/or services and/or the predetermined time period may be predefined by a managing entity and/or the user.

In other specific embodiments of the method, the abnormal pattern of usage is determined dynamically by comparing current patterns of usage to a user's baseline patterns of usage. In such embodiments of the method, the user's baseline patterns of usage may be determined by a machine learning model that is trained on the results from the monitoring of the services and applications. In other specific embodiments of the method, the abnormal pattern of usage may be predefined abnormal patterns of usage. For example, in specific embodiments of the method, the predefined pattern of usage is resetting passwords, such as resetting passwords in a designated number of applications/services over a designated time period. In such embodiments of the method a managing entity and/or the user may define the designated number of applications/services and/por the designated time period.

At Event 430, in response to determining/identifying the abnormal pattern of usage, the user is required to provide predefined biometric data to gain access or further access at least a portion of the plurality of services and applications being monitored. In specific embodiments of the invention, the biometric data must be authenticated to gain access or maintain further access to all of the plurality of services and applications being monitored. While in other embodiments of the invention, the biometric data must be authenticated to gain access or maintain further access to the services and/or applications exhibiting the abnormal pattern of usage.

At optional Event 440, the predefined biometric data is received from the user and user is authenticated based on a match between the received predefined biometric data and the user's previously stored predefined biometric data. In other optional events (not shown in FIG. 4), alerts may be generated and communicated to the user or other designated entities that alert of the occurrence of an abnormal pattern of usage or the failure to authenticate the user (i.e., failure to receive biometric data or failure to match received biometric data to the user's stored biometric data).

Thus, as described in detail above, present embodiments of the invention include systems, methods, computer program products and/or the like for a heightened level of security in a computing platform. Specifically, the present invention, monitors usage of applications and/or services residing on or accessible to a computing platform to determine abnormal usage patterns (i.e., usage patterns that are contrary to the user's conventional usage patterns). In response to determining an abnormal pattern of usage, the user is required to provide biometric data, such as voice data, facial feature data, fingerprint data or the like, as a means of authenticating the user. The abnormal pattern of usage may be determined dynamically by comparing current usage patterns to known user baseline usage patterns. Additionally, the abnormal pattern of usage may be predefined, such as the resetting of passwords in a predefined number of applications and/or services over a predefined period of time.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the same above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for requiring biometric user authentication, the system comprising:

a first computing platform having a first memory and at least one first processing device in communication with the first memory, wherein the first memory stores a plurality of network-accessible services;

a second computing platform having a second memory and at least one second processing device in communication with the second memory, wherein the second memory stores a plurality of applications; and a user authentication engine stored in the first memory or the second memory and executable by the at least one first processing device or at least one second processing device and configured to:

monitor usage by a user of the plurality of applications and services, in response to the monitoring, determine a predetermined abnormal pattern of usage amongst at least two of the plurality of applications and services that is contrary to one or more normal patterns of usage of the user, wherein the predetermined abnormal pattern of usage is defined as resetting of passwords within (i) a predetermined number greater than one of the plurality of applications and services and (ii) a predetermined period of time;

in response to determining the predetermined abnormal pattern of usage amongst the at least two of the plurality of applications and services, require the user to authenticate by providing predefined biometric data to further access the plurality of applications and services.

2. The system of claim 1, wherein the user authentication engine is further configured to:

receive the predefined biometric data and authenticate the user based on a match between the received predefined biometric data and previously stored predefined biometric data.

3. The system of claim 1, wherein the user authentication engine is further configured to, in response to determining the predetermined abnormal pattern of usage, generate and communicate an alert to a predetermined entity.

4. The system of claim 1, wherein the user authentication engine is further configured to allow the user to preconfigure at least one of (i) the predetermined number greater than one of the plurality of applications and services for determining the abnormal pattern of usage, and (ii) the predetermined period of time for determining the abnormal pattern of usage.

5. The system of claim 1, wherein the user authentication engine is configured to require the user to provide predefined biometric data to further access the plurality of applications and services, wherein the predefined biometric data is chosen from the group consisting of voice data, facial feature data and fingerprint data.

6. A computer-implemented method for requiring biometric user authentication, the computer-implemented method is executable by one or more computing processor devices, the method comprising:

monitoring usage, by a user, of a plurality of applications and a plurality of services;

in response to the monitoring, determining predetermined abnormal pattern of usage amongst at least two of the plurality of applications and services that is contrary to one or more normal patterns of usage of the user, wherein the predetermined abnormal pattern of usage is defined as resetting of passwords within (i) a predetermined number greater than one of the plurality of applications and services and (ii) a predetermined period of time; and in response to determining the predetermined abnormal pattern of usage amongst the at least two of the plurality of applications and services, requiring the user to provide predefined biometric data to further access the plurality of applications and services.

7. The computer-implemented method of claim 6, further comprising:
receiving the predefined biometric data and authenticating the user based on a match between the received predefined biometric data and previously stored predefined biometric data.

8. The computer-implemented method of claim 6, further comprising:
in response to determining the predetermined abnormal pattern of usage, generating and communicating an alert to a predetermined entity.

9. The computer-implemented method of claim 6, further comprising:
providing for the user to preconfigure at least one of (i) the predetermined number greater than one of the plurality of applications and services for determining the abnormal pattern of usage, and (ii) the predetermined period of time for determining the abnormal pattern of usage.

10. The computer-implemented method of claim 6, wherein requiring the user to provide predefined biometric data further comprises requiring the user to provide predefined biometric data, wherein the predefined biometric data is chosen from the group consisting of voice data, facial feature data and fingerprint data.

11. A computer program product including a non-transitory computer-readable medium, the non-transitory computer-readable medium comprising:
a first set of codes for causing a computer to monitor usage, by a user, of a plurality of applications and a plurality of services;
a second set of codes for causing a computer to, in response to the monitoring, determine a predetermined abnormal pattern of usage amongst at least two of the plurality of applications and services that is contrary to one or more normal patterns of usage of the user, wherein the predetermined abnormal pattern of usage is defined as resetting of passwords within (i) a predetermined number greater than one of the plurality of applications and services and (ii) a predetermined period of time; and
a third set of codes for causing a computer to, in response to determining the predetermined abnormal pattern of usage amongst the at least two of the plurality of applications and services, require the user to provide predefined biometric data to further access the plurality of applications and services.

12. The computer program product of claim 11, wherein the computer-readable medium further comprises:
a fourth set of codes for causing a computer to receive the predefined biometric data and authenticate the user based on a match between the received predefined biometric data and previously stored predefined biometric data.

13. The computer program product of claim 11, wherein the third set of codes is further configured to, in response to determining the predetermined abnormal pattern of usage, generate and communicate an alert to a predetermined entity.

14. The computer program product of claim 11, further comprising a fourth set of codes for causing a computer to provide for the user to preconfigure at least one of (i) the predetermined number greater than one of the plurality of applications and services for determining the abnormal pattern of usage, and (ii) the predetermined period of time for determining the abnormal pattern of usage.

15. The computer program product of claim 11, wherein the third set of codes is further configured to, in response to determining the predetermined abnormal pattern of usage, require the user to provide the predefined biometric data to further access the plurality of applications and services, wherein the predefined biometric data is chosen from the group consisting of voice data, facial feature data and fingerprint data.

\* \* \* \* \*